Figure 1:
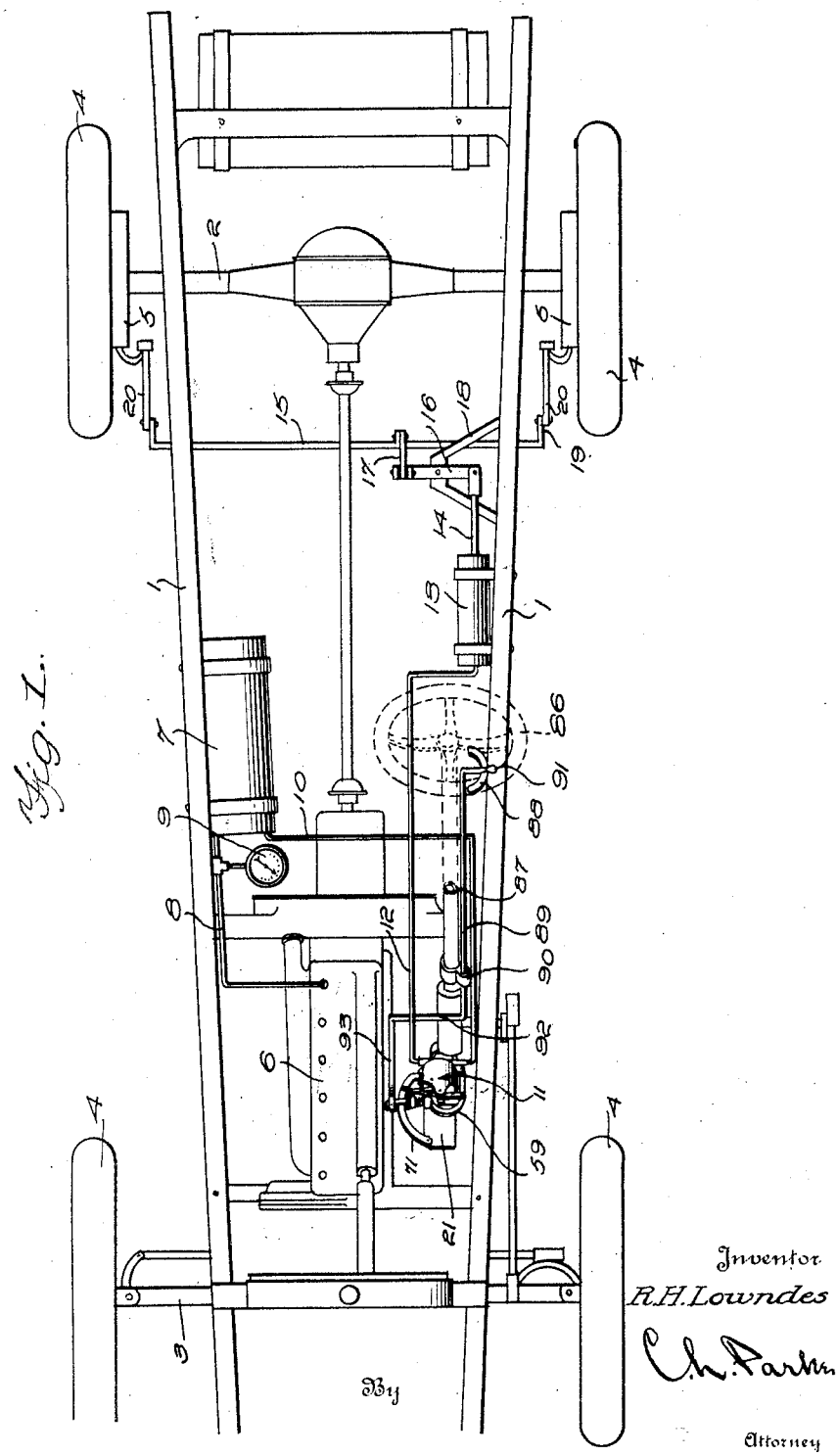

R. H. LOWNDES.
VALVE.
APPLICATION FILED JULY 18, 1921.

1,435,537.

Patented Nov. 14, 1922.
4 SHEETS—SHEET 1.

Inventor
R.H. Lowndes

By C. H. Parker

Attorney

R. H. LOWNDES.
VALVE.
APPLICATION FILED JULY 18, 1921.

1,435,537.

Patented Nov. 14, 1922.
4 SHEETS—SHEET 2.

Inventor
R. H. Lowndes,

By Ch. Parker
Attorney

R. H. LOWNDES.
VALVE.
APPLICATION FILED JULY 18, 1921.

1,435,537.

Patented Nov. 14, 1922.
4 SHEETS—SHEET 3.

Inventor
R. H. Lowndes,
By
Attorney

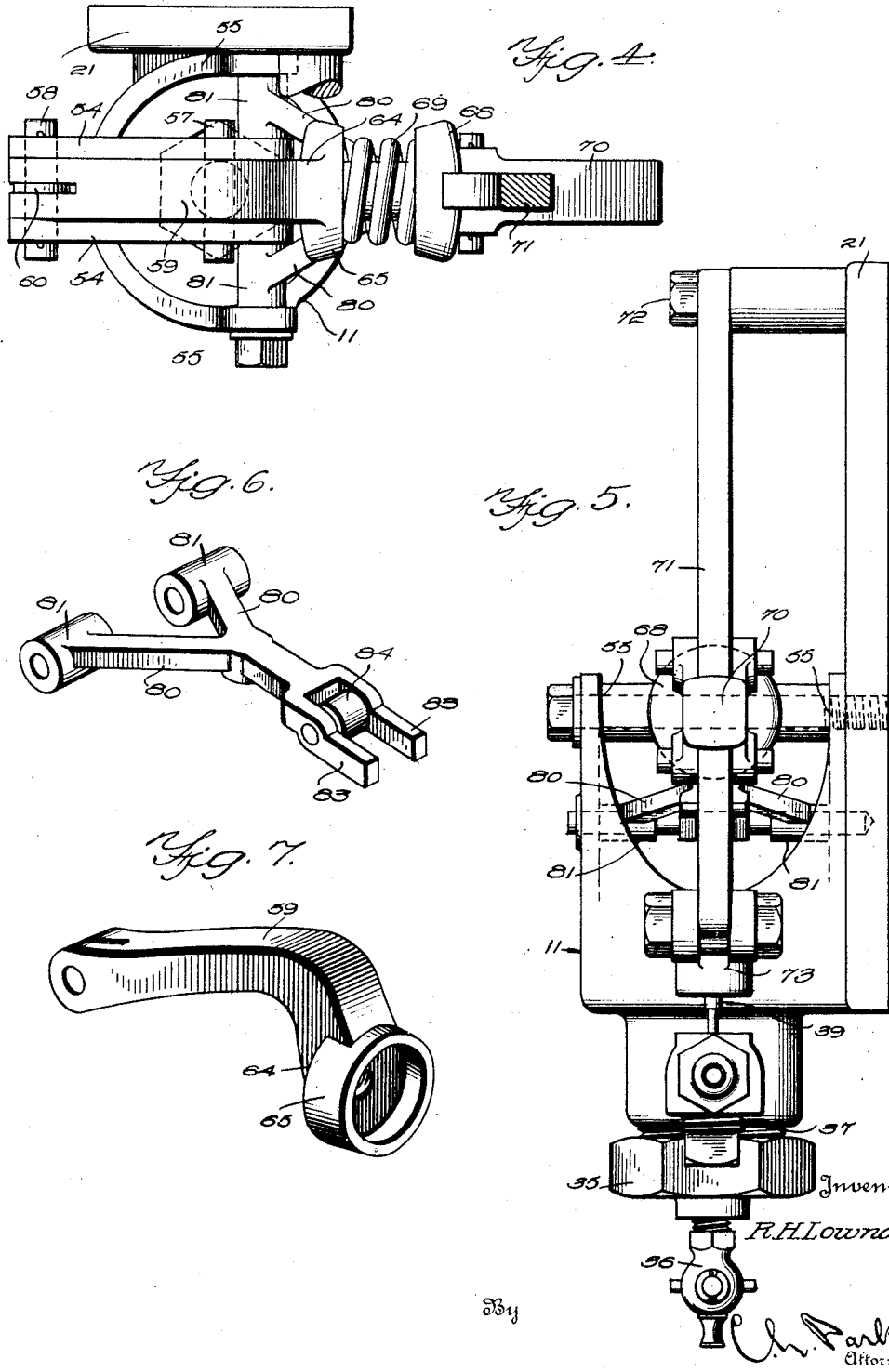

Patented Nov. 14, 1922.

1,435,537

UNITED STATES PATENT OFFICE.

RICHARD H. LOWNDES, OF ATLANTA, GEORGIA, ASSIGNOR TO MOTOR PARTS CORPORATION, OF ATLANTA, GEORGIA, A CORPORATION OF GEORGIA.

VALVE.

Application filed July 18, 1921. Serial No. 485,519.

*To all whom it may concern:*

Be it known that I, RICHARD H. LOWNDES, a citizen of the United States, residing at Atlanta, in the county of Fulton and State of Georgia, have invented certain new and useful Improvements in Valves, of which the following is a specification.

This invention relates to valves for fluid pressure systems, and more particularly to control mechanism whereby a predetermined pressure may be admitted to a pressure operated apparatus and the valve automatically closed to retain the desired pressure.

It is an object of the present invention to provide a pressure control apparatus including a valve, and actuating mechanism therefor, whereby a desired pressure may be obtained and the valve automatically closed.

When the valve has been opened to permit passage of fluid into the apparatus, the valve operating mechanism may be returned to neutral position, and the pressure retained in the apparatus for an indefinite time. When the pressure is to be released, the valve actuating mechanism is moved in the opposite direction to open an exhaust valve and permit escape of fluid.

A valve stem is provided with a diaphragm or other flexible member, and when the valve actuating mechanism is arranged in position to supply a desired pressure to the valve stem, the valve is opened and the pressure in the apparatus is transmitted to the diaphragm. When the pressure in the apparatus reaches the predetermined limit, the diaphragm is capable of moving the valve against the valve operating mechanism to closed position.

The valve actuating mechanism comprises a pivoted link having the valve stem connected thereto adjacent the pivot and being connected to a control lever. The control lever operates on a quadrant and applies a force to the outer end of the link to move it downwardly on its pivot and thus unseat the valve. The moment applied to the link is directly proportional to the chord of the arc described by the control lever, and the parts are so proportioned that the pressure on the diaphragm is capable of closing the valve with the control lever in said position.

In illustrating the invention, I have shown the control mechanism or valve applied to an air brake system for motor vehicles, but the invention is in no sense restricted to this use, and the showing is merely by way of illustration. The valve may be used in a number of different ways as, for instance, in connection with air hose, air jacks, air drills, air operated dental tools, and any other tools or apparatus actuated by compressed air or other fluid under pressure.

Figure 2:
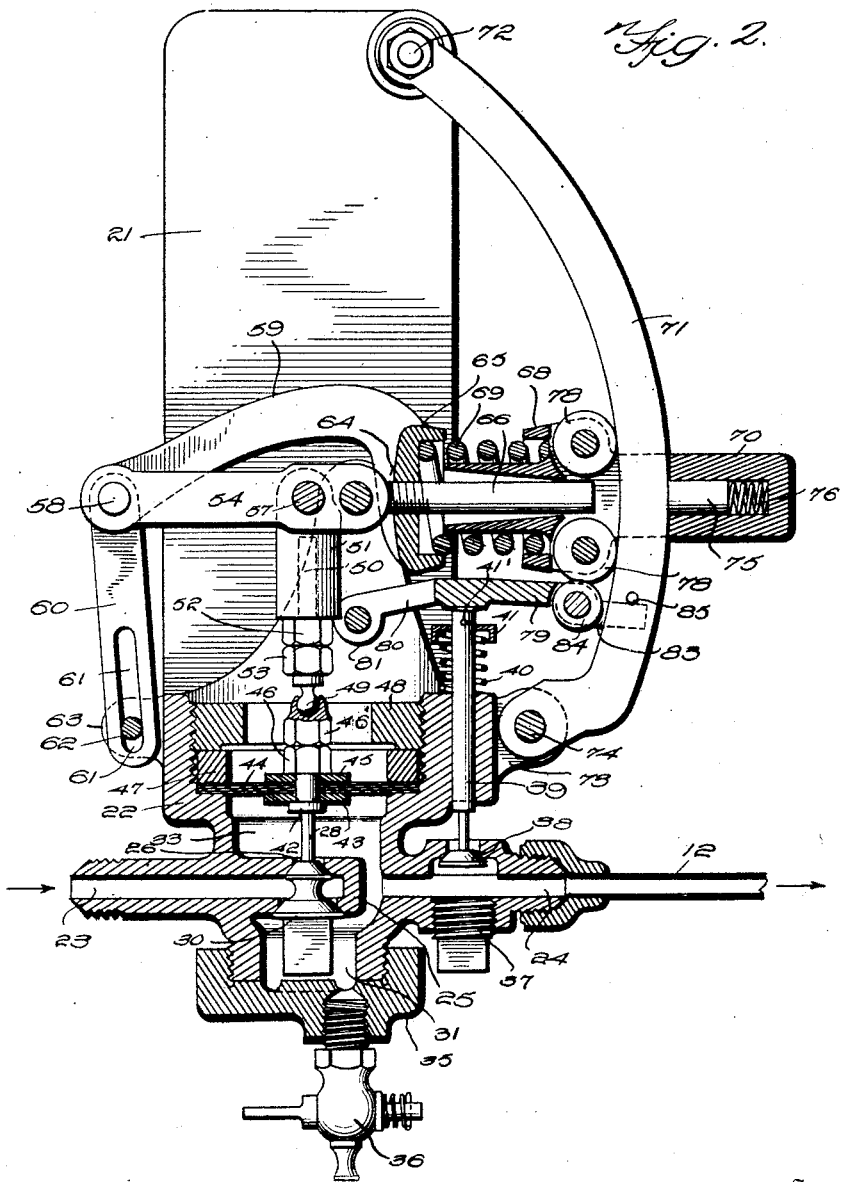
Figure 3:
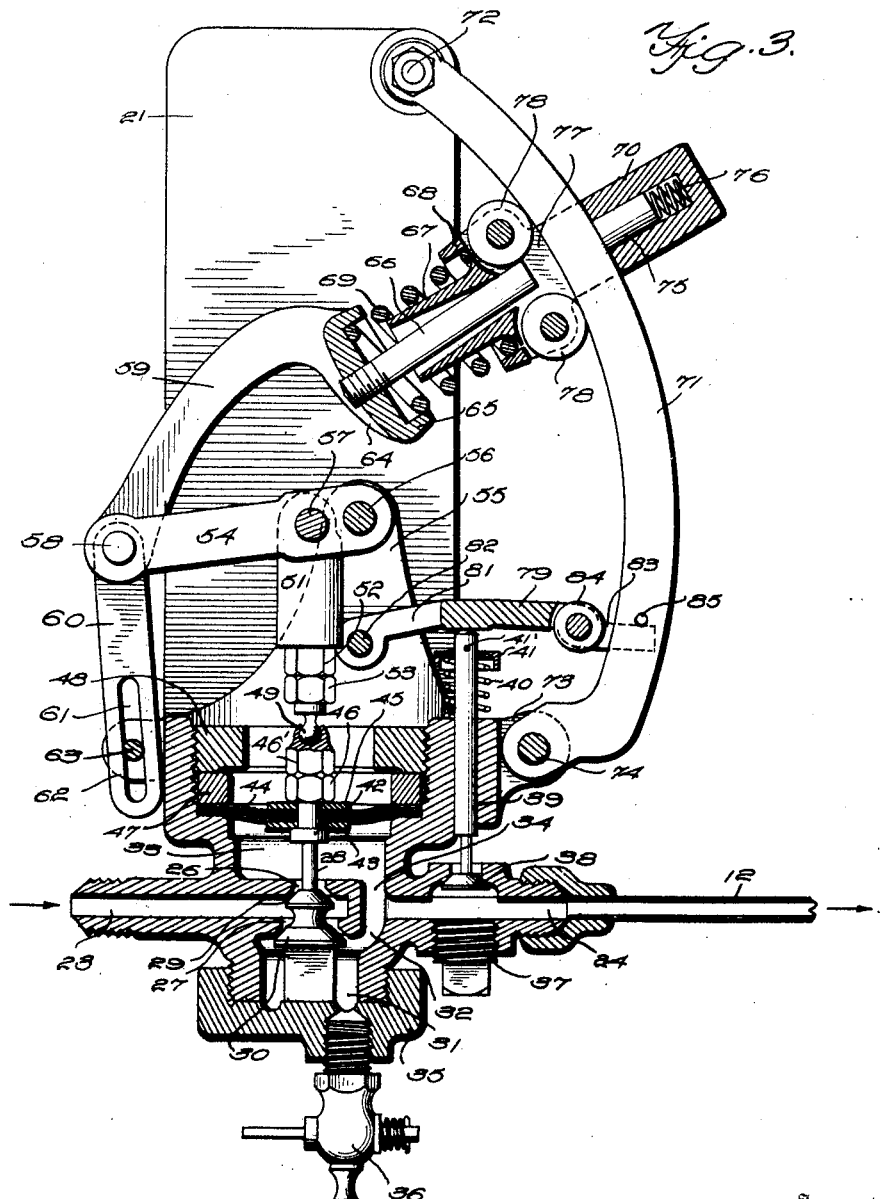

In the accompanying drawings, I have shown one embodiment of the invention. In this showing:

Figure 1 is a plan view of the chassis of a motor vehicle showing the invention applied, Figure 2 is a vertical sectional view of the valve in closed position, Figure 3 is a similar view showing the valve in open position, Figure 4 is a plan view of the valve, Figure 5 is an end elevation thereof, Figure 6 is a detail view of the exhaust valve lever, and, Figure 7 is a detail view of a portion of the control lever.

Referring to the drawings, the reference numeral 1 designates the frame of a motor vehicle provided with the rear axle 2, and a front axle 3. The usual traction wheels 4 are mounted on the axles and brake bands 5 are arranged on the rear axle adapted to cooperate with the rear wheels. The vehicle is provided with an internal combustion engine 6, or other source of power, adapted to supply fluid under pressure to a tank 7. As shown, the tank is connected to the engine by means of a pipe 8 and a pressure gauge 9 may be arranged in this pipe. The tank is provided with an outlet pipe 10, communicating with the control valve 11. A pipe 12 leads from the valve to a brake cylinder 13. A piston is mounted within the brake cylinder and is provided with a piston rod 14, connected in any suitable manner to the brakes to apply the brakes when fluid under pressure is supplied to the brake cylinder. As shown, a transverse rod or shaft 15 is connected to the piston rod by means of a link 16 and a crank or arm 17. The link is pivotally supported on a bracket 18, carried by the frame. The ends of the shaft 15 are provided with cranks 19 to which the valve operating rods 20 are secured. As the particular brake construction froms no part of the invention, a detail description thereof is deemed unnecessary.

The control valve comprises a base plate or support 21 which is preferably secured to a part of the frame of the vehicle or to the base of the engine. A valve chamber 22 is arranged on the base plate, the valve chamber being secured thereto in any suitable manner, or being cast integral therewith. The inlet pipe 10 is connected to the inlet opening 23 of the valve chamber and the pipe 12 is connected to the outlet opening 24. The inner end of the inlet pipe is closed, as at 25, and the pipe is provided with a pair of openings 26 and 27, arranged in vertical alignment with each other. A valve stem 28 is arranged within the valve chamber and is provided with a pair of balanced valves 29 and 30, adapted to seat on valve seats formed in the openings 26 and 27 respectively. In place of a double balanced valve, 29 and 30, applicable to heavy units, a single valve may be used in small units. The lower part of the valve chamber 31 communicates with the outlet 24 by means of a passage 32. A pressure chamber 33 is arranged in the upper part of the valve chamber and communicates with the outlet by means of a passage 34. The chamber 31 is closed by a threaded plug 35, and this plug may be provided with a threaded opening for the reception of a pet cock 36, to permit accumulated moisture or oil to be drained from the valve chamber.

The outlet 24 is provided with a pair of openings arranged in alignment with each other, the lower opening being closed by a threaded plug 37, and the upper opening being normally closed by a valve 38 mounted on a valve stem 39. The valve stem is normally retained in closed position by means of a coil spring 40, arranged between a cup 41, surrounding the valve stem and a portion of the supporting mechanism. A pin 41' retains the cup 41 and spring 40 in position.

The main valve stem 28 is provided with an enlargement 42, adapted to form a seat for a disk 43, made of metal or other suitable material. A diaphragm 44 is arranged above the disk and a second disk 45 is placed over the diaphragm. A nut 46 is mounted on the stem and is adapted to hold the disks and diaphragm in position. The outer edge of the diaphragm is retained in position by means of a ring 47 and lock nut 48, which latter is adapted to engage threads formed in the upper portion of the valve chamber. A lock nut 46' is arranged on the valve stem above the nut 46.

The lock nut 46' is provided with a socket at its upper end for the reception of the ball 49, carried by a valve stem or rod 50. The valve stem is received within a sleeve 51, the parts being arranged to permit slight vertical movement of the stem within the sleeve. The position of the sleeve with respect to the stem may be adjusted by means of nut 52 and locking nut 53 arranged on the valve stem.

The means for opening the balanced valves 29 and 30 consists of a main double float link 54 pivotally supported in brackets 55, as at 56. The sleeve 51 is pivotally secured to the link as at 57. The outer end of the link is provided with a pivot pin 58 to which a control lever 59 is secured. A link 60 is also secured to the main link by means of the pin 58 and extends downwardly, the lower portion thereof being provided with an elongated slot 61, adapted to receive a pin 62, carried by a pair of ears 63, mounted on the base plate.

The control lever is provided with an offset end 64 having a cup 65 formed thereon. A rod or bolt 66 is arranged in the center of the cup, and extends at substantially right angles to the plane of the cup. A sleeve 67 surrounds this rod, the sleeve being provided with a cup 68, at its outer end, adapted to cooperate with the cup 65 to receive a coil spring 69 surrounding the rod 66 and the sleeve 67.

The sleeve is extended to form a handle 70, being slotted for the reception of a quadrant 71. As shown, the quadrant is secured in brackets 73 by means of a bolt or pin 74. The handle 70 is provided with an opening for the reception of a member 75, retained in engagement with the quadrant by means of a coil spring 76. The member 75 is employed to supply a slight amount of friction to prevent the control lever from being accidentally moved from a given position. On the opposite side of the quadrant, the handle is shaped to form a saddle 77, carrying a pair of rollers 78, engaging the quadrant to guide the handle and control lever.

The exhaust valve is controlled by means of a lever 79. The lever is provided with a pair of arms 80, forming a substantially Y-shaped member and these arms are provided with bearings 81 for the reception of pivot pins 82, mounted in the bracket 55 or other suitable support. As shown, the lever is disposed above the exhaust valve stem 39 in engagement therewith. The other end of the lever is forked, providing a pair of arms 83 adapted to extend on opposite sides of the quadrant, as shown. A roller 84 is mounted between the arms and is adapted to be engaged by the lower roller 78 when the control lever is lowered to open the exhaust valve. Upward movement of the exhaust valve lever is limited by pins 85, carried by the quadrant and engaging the arms 83.

The valve may be arranged on any convenient part of the vehicle and operated from the driver's seat. As shown, the vehicle is provided with the usual steering wheel 86, connected to the steering post 87. A quadrant 88 may be mounted on the steering wheel and a shaft 89 disposed adjacent the steering post casing, the shaft being rotatably mounted in a bearing 90, carried by the steering post casing. The upper end of the shaft is provided with an operating handle 91, the lower end of the shaft being provided with an offset portion 92, forming a crank and having an offset end 93, connected to the handle 70.

The operation of the device is as follows:

The control lever being formed in two parts, the spring 69 tends to exert a pressure in either direction. The pressure in one direction causes the rollers 78 to be retained in engagement with the quadrant. With the parts in the position shown in Figure 2 of the drawings, the control mechanism is in neutral position, or on dead center, the pivot pins 56, 57, and 58 being in alinement with each other, and in line with the direction of the force placed on the control lever 59 by the spring 69. When the control lever is moved along the quadrant, it rotates about the pin 58 as an axis, the quadrant being formed on a circle having the pin 58 as a center. The force now applied to the control lever 59 tends to move the pin 58 downwardly, and is directly proportional to the chord of the arc described by the movement of the control lever from neutral position to the open position. When the pin 58 is moved downwardly, the float link 54 to which it is connected, moves about the pivot pin 57 as an axis, lowering the pivot pin 57 and the valve stem and opening the balanced valves 29 and 30. This permits the fluid under pressure to pass from the storage tank 7 to the brake cylinder 12 and apply the brakes. The pressure in the brake cylinder is also set up in the pressure chamber 33 of the valve and transmitted to the diaphragm 44, tending to close the valve. When the pressure in the brake cylinder and the pressure chamber 34 becomes sufficient to offset the force exerted on the pin 58 by the spring 69, the diaphragm moves to its initial position shown in Figure 2, and closes the valves 29 and 30. The pressure in the brake cylinder may be retained for an indefinite time and the valve control lever returned to neutral position. It will be apparent that by regulating the distance through which the control lever is moved, the pressure in the pressure chamber 34 and the brake cylinder necessary to offset the force of the spring 69 for a given position, may be varied and the pressure applied to the brakes may thus be regulated.

When the pressure on the brakes is to be relieved, the valve control lever is moved downwardly a slight distance below the neutral position, and the lower roller 78 in engagement with the roller 84, moves the exhaust valve lever 79 on its pivot to depress the exhaust valve stem 39 and open the exhaust valve 38. The downward movement is limited by means of the roller 84 engaging the quadrant.

When the lever is moved below the center line to open the exhaust valve, the spring 69 tends to lift pin 58 which will move the floating link upwardly on its pivot. To prevent undue tension on the valve stem when the exhaust valve is open, the upward movement of the pin 58 and link 54 is limited by means of link 60.

It will be noted that when the control lever has been moved to the desired position to establish the proper pressure in the brake cylinder, it is unnecessary for the operator to exert force on the control lever to retain it in position and the vehicle may be left standing with the brakes applied.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A valve for fluid pressure systems, comprising a valve chamber having an inlet opening and an outlet opening, a valve seat arranged in said chamber, a valve adapted to engage said valve seat, a valve stem secured thereto, a pressure chamber through which said valve stem extends, said pressure chamber being arranged on the outlet side of the valve, a diaphragm mounted in said chamber and connected with said valve stem, said diaphragm tending to close the valve when a pressure exists in the pressure chamber, a control member for supplying a predetermined force to said valve stem to open said valve, said control member being capable of instantaneous adjustment to secure a desired pressure and being independent of the force of gravity, whereby said valve may be mounted in any desired position, and means for exerting a constant force on said control member to retain it in an adjusted position.

2. A valve for fluid pressure systems, comprising a valve chamber having an inlet opening and an outlet opening, a valve seat arranged in said chamber, a valve adapted to engage said valve seat, a valve stem secured thereto, a pressure chamber through which said valve stem extends, said pressure chamber being arranged on the outlet side of the valve, a diaphragm mounted in said chamber and connected with said valve stem, said diaphragm tending to close the valve when a pressure exists in the pressure chamber, a pivoted link engaging said valve stem to open the valve, a control member for supplying a predetermined force to said link to open the valve, said control member being capable of instantaneous adjustment to secure a desired pressure, and means for exerting a constant force on said control member to retain it in an adjusted position.

3. A valve for fluid pressure systems, comprising a valve chamber having an inlet opening and an outlet opening, a valve seat arranged in said chamber, a valve adapted to engage said valve seat, a valve stem secured thereto, a pressure chamber through which said valve stem extends, said pressure chamber being arranged on the outlet side of the valve, a diaphragm mounted in said chamber and connected with said valve stem, said diaphragm tending to close the valve when a pressure exists in the pressure chamber, a pivoted link to which said valve stem is connected, said valve stem being connected to said link intermediate the ends thereof, said link being pivotally supported at one end, and a control member secured to the other end of said link to apply a force thereto, said control member being capable of instantaneous adjustment, and means for supplying a constant force to said control member to retain it in an adjusted position.

4. In a fluid pressure control, a valve casing, a valve arranged therein, a valve stem secured thereto, and operating means comprising a control lever, a spring engaging one end of said lever and exerting a force thereon, a link connected to the opposite end of the control lever, said link being pivotally supported at its other end, and connected to said valve stem intermediate its ends whereby the force exerted on said link to open the valve will be proportionate to the angular position of the control lever, and a diaphragm arranged on the outlet side of the valve and connecting with said valve stem, to automatically close the valve when the pressure on the outlet side is greater than the force applied by the spring in a given position.

5. In a fluid pressure control, a valve casing, a valve arranged therein, a valve stem secured thereto, and operating means comprising a control lever, a spring engaging one end of said lever and exerting a force thereon, a link connected to the opposite end of the control lever, said link being pivotally supported at its other end, and connected to said valve stem intermediate its ends whereby the force exerted on said link to open the valve will be proportionate to the angular position of the control lever, a diaphragm arranged on the outlet side of the valve and connecting with said valve stem, to automatically close the valve when the pressure on the outlet side is greater than the force applied by the spring in a given position, and an exhaust valve actuated by said control lever to release the air from the outlet side of the valve.

6. In a fluid pressure control, a valve casing, a main valve arranged therein, a valve stem secured to said valve, and control mechanism therefor, said control mechanism comprising a link pivotally supported at one end, said valve stem being connected to the link intermediate its ends, a control lever connected to the other end of the link, means for supplying a force longitudinally of said control lever whereby the control lever will be in a neutral position when the link pivot and the connections are arranged in the same plane, and a force proportionate to the angular position of the control lever will be applied to the end of the link when the control lever is moved about the end of the link as a pivot, a quadrant on which said control lever operates, and a diaphragm arranged in the valve casing on the outlet side of the valve and connecting with said valve stem to close the valve when the pressure on the outlet side of the valve exceeds a force applied by the control lever.

7. In a fluid pressure control, a valve casing, a balanced valve arranged therein, a valve stem secured to said valve, and control mechanism therefor, said control mechanism comprising a link pivotally supported at one end, said valve stem being connected to the link intermediate its ends, a control lever connected to the other end of the link, means for supplying a force longitudinally of said control lever whereby the control lever will be in a neutral position when the link pivot and connections are in the same plane, and a turning moment proportional to the angular position of the control lever will be applied to the end of the link when the control lever is moved about the end of the link as a pivot, a quadrant on which said control lever operates, and a diaphragm arranged in the valve casing on the outlet side of the valve and connecting with the valve stem to close the valve when the pressure on the outlet side of the valve exceeds the force applied by the control lever.

8. In a fluid pressure control, a valve casing, a valve arranged therein, a valve stem secured thereto, and operating means comprising a control lever, means for exerting a force on one end of said control lever, a link connected to the opposite end of the control lever, said link being pivotally supported, said valve stem being connected to said link whereby the force exerted on said link to open the valve will be proportionate to the angular position of the control lever, and a diaphragm arranged on the outlet side of the valve and connecting with the valve stem to automatically close the valve when the pressure on the outlet side is greater than the force applied to the control lever in a given position.

9. In a fluid pressure control, a valve casing, a main valve arranged therein, a valve stem secured to said valve, and control mechanism therefor, said control mechanism comprising a pivoted link, said valve stem being connected thereto, a control lever pivotally connected to said link, means for applying a force longitudinally of said control lever whereby the control lever will be in a neutral position when the link pivot and the connections are arranged in the same plane and a force proportionate to the angular position of the control lever will be applied to the end of the link when the control lever is moved about the link as a pivot, and a diaphragm arranged in the valve casing on the outlet side of the valve and connecting the said valve stem to close the valve when the pressure on the outlet side of the valve exceeds the force applied by the control lever.

10. In a fluid pressure control, a valve casing, a valve arranged therein, a valve stem secured thereto, an operating means comprising a control lever, a spring engaging said lever and exerting a force thereon, a pivotally supported link connected to said control lever, said link being connected to said valve stem, whereby the force exerted on said link to open the valve will be proportionate to the angular position of the control lever, and the force required to move said control lever will be constant and independent of the position of said control lever, and a diaphragm arranged on the outlet side of the valve and connecting with the valve stem to automatically close the valve when the pressure on the outlet side is greater than the force applied by the spring in a given position.

In testimony whereof I affix my signature in presence of two witnesses.

RICHARD H. LOWNDES.

Witnesses:
 ALICE LOWNDES,
 Mrs. INEZ W. LOWNDES.